United States Patent [19]
Bleeker et al.

[11] 4,194,827
[45] Mar. 25, 1980

[54] FIBER OPTICAL ELEMENT IMAGING AND ILLUMINATION ASSEMBLY

[75] Inventors: Lyle A. Bleeker, Saint Paul; Richard Owen, Minneapolis, both of Minn.

[73] Assignee: Minnesota Mining and Manufacturing Company, Saint Paul, Minn.

[21] Appl. No.: 937,463

[22] Filed: Aug. 28, 1978

[51] Int. Cl.² ............................................. G03B 27/00
[52] U.S. Cl. ...................................... 355/1; 350/96.11; 350/96.18; 355/70
[58] Field of Search ...................... 355/1, 67, 70, 8, 50, 355/51; 350/96.11, 96.18

[56] References Cited

U.S. PATENT DOCUMENTS

| | | | |
|---|---|---|---|
| 3,125,013 | 3/1964 | Herrick, Jr. et al. | 355/1 |
| 3,175,481 | 3/1965 | Lahr | 355/1 |
| 3,232,201 | 2/1966 | Frank et al. | 355/1 X |
| 3,398,669 | 8/1968 | Hicks, Jr. | 355/1 |
| 3,658,407 | 4/1972 | Kitano et al. | 355/1 X |
| 3,792,964 | 2/1974 | Chatterji | 355/1 X |
| 3,936,672 | 2/1976 | Tanaka | 355/1 X |
| 3,942,886 | 3/1976 | Tanaka | 355/1 |
| 3,947,106 | 3/1976 | Hamaguchi et al. | 355/1 |
| 3,947,115 | 3/1976 | Hamaguchi | 355/8 |
| 3,955,888 | 5/1976 | Kekiuchi et al. | 355/1 |
| 3,977,777 | 8/1976 | Tanaka et al. | 355/1 |
| 3,981,575 | 9/1976 | Tanaka et al. | 355/1 |
| 4,059,345 | 11/1977 | Kawamura et al. | 355/1 X |
| 4,068,936 | 1/1978 | Kushima et al. | 355/1 |

FOREIGN PATENT DOCUMENTS

| | | | |
|---|---|---|---|
| 42-13207 | 7/1967 | Japan | 355/1 |
| 1183973 | 3/1970 | United Kingdom . | |

*Primary Examiner*—Richard A. Wintercorn
*Attorney, Agent, or Firm*—Cruzan Alexander; Donald M. Sell; William B. Barte

[57] ABSTRACT

A unitary optical element as provided together with a tubular light source and housing therearound to form an integrated optical assembly suitable for illuminating a line of a graphic original traversed across one surface of the assembly, such that an image of the illuminated line is formed on a photoreceptive surface traversed across another surface of the assembly. The optical element includes a linear array of optical fibers for conveying light reflected from the original onto the receptor surface, which fibers are optically coupled and integrally bonded to a light collection member such that light from the tubular source is directed onto the collection member and over into the sides of the fibers to emerge through the fiber end, thus directly illuminating a line on the original.

17 Claims, 5 Drawing Figures

FIBER OPTICAL ELEMENT IMAGING AND ILLUMINATION ASSEMBLY

BACKGROUND OF THE INVENTION

1. Field of the Invention

This invention relates to fiber optic arrays, and to the use thereof in an image forming station in a photocopy device.

2. Description of the Prior Art

For a number of years various investigators have contemplated ways of eliminating troublesome lenses and mirrors typically found in photocopy devices for conveying light reflected from a graphic original (and which is, therefore, capable of forming an image of said original) onto a light sensitive receptor sheet at which the image is formed. One approach frequently encountered, for example, is to contact expose, directing light either through the backside of the original or receptor sheet. Another approach, more germane to the present invention, has been to suggest an array of coherent optical fibers having a high index core and a low index clad for conveying a line of light reflected from the original onto the receptor sheet, while simultaneously traversing the original and receptor sheet past opposite ends of the array such that the original is scanned and a corresponding scanned image is formed on the receptor sheet.

Despite the relatively long time such a concept has been recognized, photocopy devices embodying such an optical configuration have not been commercialized. It is believed that prior concepts have suffered from a common inability to provide a commercially viable structure by which sufficient quantities of light could be directed onto the original proximate the end of the array of fibers. For example, U.S. Pat. No. 3,125,013 (Herrick et al) discloses a reflex copying apparatus which utilizes a complicated fiber optic array both for transmitting light reflected from a graphic original onto a receptor sheet and for conveying illuminating light from light sources positioned on both sides of the array onto the original. GB Pat. No. 1,183,973 also depicts a similar scheme of alternatively positioned fibers for illumination and image transmission. U.S. Pat. No. 3,175,481 (Lahr) discloses a document copier in which a single row of optical fibers is positioned in a linear plane extending between and normal to the direction of movement of a document and receptor sheet. In that apparatus, illumination of the document appears to be provided by tubular light sources separately positioned on each side of the fiber array, the light being focused into a single line of light extending transversely across the document and adjacent the array by additionally positioned converging lenses. Such a cumbersome assembly, which still requires the use of lenses has not, apparently, been able to provide advantages over the optical systems used in conventional, lens oriented, copy machines.

A similar assembly is also depicted in U.S. Pat. No. 3,232,201 (Frank and Michel), but in which the lens used to focus the light onto the document is replaced by a prism. In U.S. Pat. No. 3,398,669 (Hicks) such optical concentrating elements are omitted; however, separately positioned tubular light sources on both sides of an optical fiber array are depicted.

More recently, the Minolta Corporation has disclosed a prototype of a photocopier which utilizes an array of graded-index fibers such as that disclosed in U.S. Pat. No. 3,658,407 (Kitano). Other patents, including U.S. Pat. Nos. 3,936,672 (Tanaka), 3,947,106 (Hamaguchi et al), 3,955,888 (Kakiuchi et al), 3,981,575 (Tanaka et al) and 4,068,936 (Kushima et al) may relate to various aspects of that copier.

SUMMARY OF THE INVENTION

Despite the various attempts to develop a copier utilizing an optical fiber image transmitter, none of the previously known devices have been fully acceptable. At least part of the reason for such lack of acceptance is believed to lie in the inability of previously known devices to direct a sufficient quantity of light onto the original document adjacent the fiber array and to, in turn, transmit a sufficient quantity of reflected light onto a receptor sheet to enable the production of acceptable quality copies within exposure times that are consistent with presently available devices utilizing conventional optics. A further limitation of such previously known devices has been the need to position and align the respective members.

In the present invention, such limitations have been overcome by providing a unitary optical element which is adapted for use in a photocopy machine for both directing light onto a graphic original and for conveying light reflected therefrom onto a light sensitive receptor sheet. Light thus directed illuminates successive lines of the original as it is caused to be traversed thereby, and an image of the successive lines is formed on the receptor sheet as it is caused to be traversed thereby. The element comprises a substantially linear array of mutually parallel coherent optical fibers, a transparent light collection member and a support means, all of which are integrally bonded together. The light collection member has a first, desirably semi-cylindrical, surface extending the length thereof for collecting light directed thereat and, as noted above, is integrally bonded in an optically coupled relationship to the array such that a top surface of the member terminated coplanar with a first end of the fibers. The optically coupled relationship thus enables light collected within the member to be transmitted therethrough and thence into and through the fibers of the array to illuminate a narrow band adjacent the first end of the fibers.

Preferably, the light collection member includes two elongate sections, each of which is integrally bonded in an optically coupled relationship to opposite sides of the array and has a first surface for collecting light directed thereat such that light directed into either section is collected and ultimately directed to illuminate the narrow band adjacent the first end of the fibers. The support means comprises an elongate member within which the fiber array is integrally bonded and to which the collection member is also integrally bonded. The support means further includes a base section having a lower surface at which the other end of the fiber array terminates.

In another embodiment, the present invention includes such a unitary optical element in an integrated optical assembly which further includes at least one tubular lamp, an elongate housing member for enclosing the lamp and for mating with the support means of the optical element to position and support the element of and bracket means for supporting the housing member and lamp, and for mounting the assembly in the photocopier. In such an embodiment, the tubular lamp is positioned parallel to and adjacent the first surface of the light collection member such that light therefrom is uniformly directed onto that surface and thence through the fiber array.

Analogously, other types of light sources capable of providing uniform illumination across the light collection member may also be used. For example, a tubular lamp having segmented filament, a series of discrete incandescent lamps, or a single lamp and reflector assembly for uniformly spreading the light may be employed.

The elongate housing member has a recess extending therealong, of a substantially U-shaped cross-section adapted to partially enclose the lamp. The means for mating with the support means of the optical element results in the optical element being positioned along the open portion of the housing member, thereby completing the enclosure around the lamp such that light therefrom is directed only onto the first surface of the collection member and is shielded from impinging on other surfaces so as to prevent undesired exposure of the receptor sheet. The housing member is further provided with upper and lower surfaces which are coextensive with the top surface of the collection member and the lower surface of the support means when the optical element is mated, thus providing platens across which the original and receptor sheet may be traversed.

The integrated assembly of the present invention thus results in a complete, integral cartridge-like module providing a 1:1 combined imaging and illumination source assembly which is both very compact, very cost effective, and which yet provides very high performance capabilities. The assembly is desirably used when a graphic original moves across and in contact with the top of the assembly, while a photosensitive receptor surface moves in exact synchronization in the opposite direction across the bottom of the assembly. The assembly is particularly advantageous in that it can be manufactured anywhere in the world, readily shipped and installed, like a cartridge or cassette, in a copier made for its acceptance, but without costly, labor intensive, trial and error aligning, adjusting, assembling, balancing, matching, testing and fitting of sources, lenses, mirrors, paper and receptor transports generally necessary copiers utilizing conventional optical systems. The simplicity of the present invention further eliminates much need for skilled labor in the assembly of the ultimate copier.

The narrow exposure slit further enables the assembly to be utilized in a copier providing either image reduction and/or enlargement. A differential rate of movement of the original and receptor surface will cause an attendant reduction or enlargement of the image parallel to the directions of movement. For many applications, such as written matter, in which a predominant portion of the graphic original comprises substantially vertical lines, such a one-dimensional change in size may be sufficient. Where a two-dimensional change is desired, the modified image is then copied a second time, rotated 90° to provide a desired reduction or enlargement along the other dimension. Similarly, the image may be partially rotated to provide a slanted copy or the like.

DESCRIPTION OF THE PREFERRED EMBODIMENT

Figure 1:
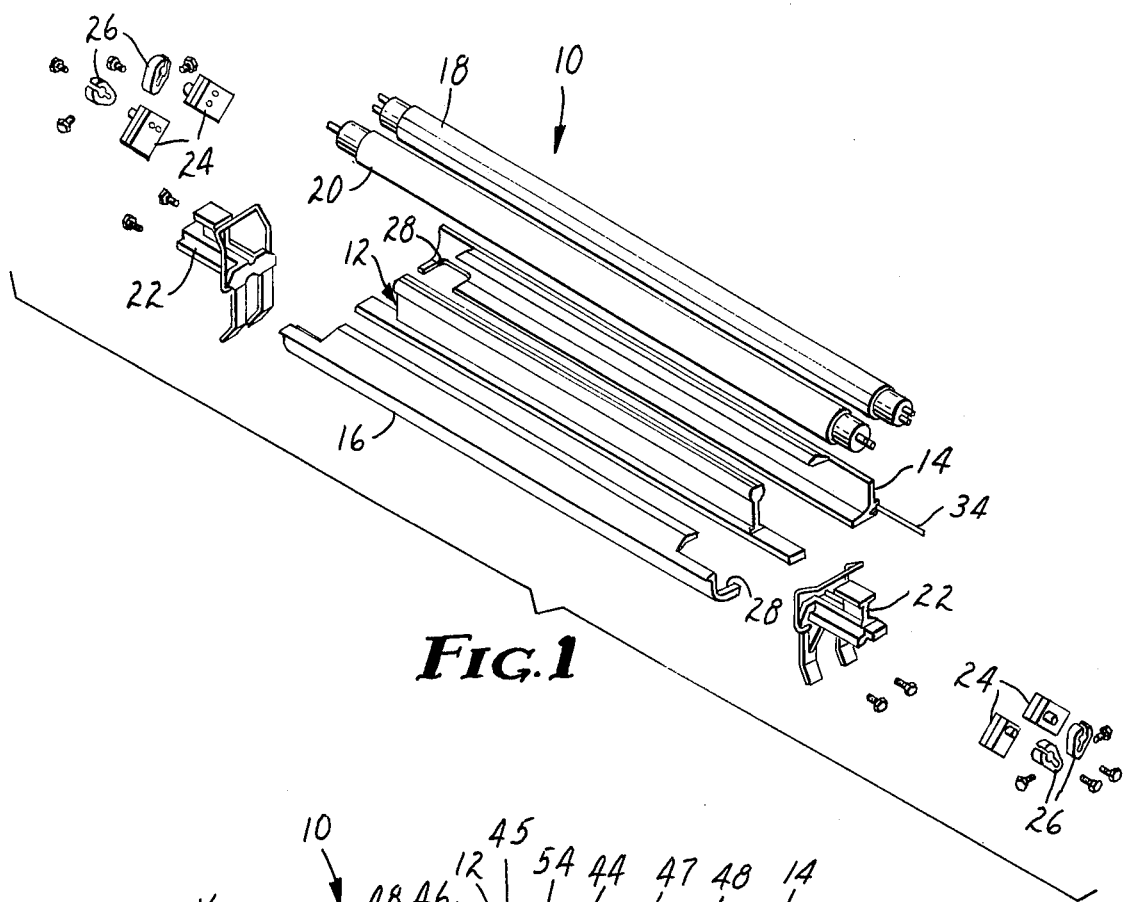
FIG. 1 is an exploded view of an integrated optical assembly of the present invention.
Figure 2:
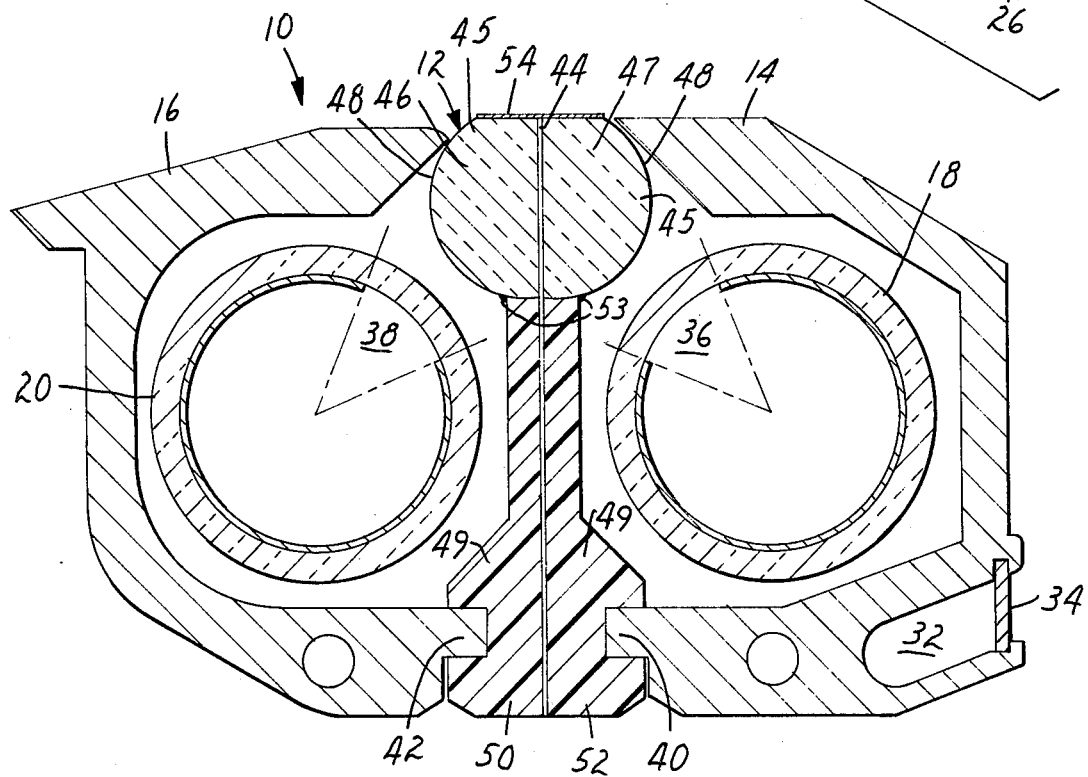
FIG. 2 is a cross-sectional view of the assembly shown in FIG. 1.

As shown in FIG. 1, and in the detailed cross-sectional view of FIG. 2, in a preferred embodiment of the present invention, the optical assembly 10 includes a unitary optical element 12, a front housing 14, a rear housing 16, a pair of fluorescent lamps 18 and 20, and a pair of lamp supports 22. In addition to the aforementioned components, sockets 24 for enabling electrical connections to the lamps 18 and 20, and socket holders 26 are provided as appropriate.

The assembly is desirably dimensioned to allow a conventionally sized graphic original and copy media to be traversed adjacent the upper and lower portions of the assembly, respectively. Accordingly, the optical element 12 is desirably 230 mm long, so as to enable exposure of an 8½ inch (216 mm) graphic original and copy sheet, approximately 26 mm high and provides an exposure slit of 0.006 inches (0.15 mm). The front and rear housings 14 and 16, respectively, as well as the fluorescent lamps 18 and 20 which are housed within the housings 14 and 16 are correspondingly dimensioned to provide uniform illumination of a graphic original traversed along the upper surface of the optical element 12. The lamps are thus desirably approximately 330 mm long, and have a diameter of approximately 14.7 mm. Particularly desired lamps have a 45° aperture slit. The lamps are positioned within the recesses in the respective housings such that the light emitted through the slit is directed at the optical element 12. A particularly desired lamp type is produced by the Sylvania Company as type F9TS/CB/45°/RS. Such lamps have a nominal rating of 11 watts, and are coated with a type C blue phosphor, having a peak illumination at 492 nanometers. The front and rear housing members 14 and 16 are correspondingly constructed to have a length of approximately 280 mm and to have an opening between the upper and lower portions thereof of approximately 20 mm for receiving the respective lamps.

The construction of the respective components shown in FIG. 1 and the manner in which they are positioned with respect to each other is shown in more detail in the cross-sectional view of FIG. 2. In that figure, it may be seen that the housing members 14 and 16 have a substantially U-shaped cross-section, and are positioned on opposite sides of the optical element 12 such that that element extends across the openings of the housing members, thus completing the cavity within which the lamps 18 and 20 are centered. Each of the housing members 14 and 16 is further desirably provided with openings 28 to enable a coolant such as forced air to be directed therethrough to aid in heat dissipation. The 45° annular slits 36 and 38 of each lamp are directed toward the optical element 12. The front housing 14 is provided with a recess 32 into which a retainer member 34 may be inserted to provide a cavity within which wiring to the respective lamps 18 and 20 may be secured.

The housing members 14 and 16 are desirably formed of extruded aluminum and are provided with flat back surfaces to minimize unwanted reflections. Further, such an aluminum construction enhances the heat dissipation characteristics so as to provide a sink for heat generated within the lamps. Analogously, the housing members 14 and 16 may be constructed of impact resistant plastics of the like, and interior surfaces thereof finished as appropriate to prevent unwanted reflections.

When the lamps 18 and 20 are centered within the respective housing members, the 15° annular slits 36 and 38 of each lamp are directed toward the upper portion of the optical element 12. Each of the housing members 14 and 16 are further provided with projections 40 and 42 which are adapted to mate with corresponding recesses in optical element 12 to complete the assembly.

The optical element 12 is shown in FIG. 2 to comprise an array of optical fibers 44 which extend from the top through to the bottom of the element, a transparent light collection member 45, including a pair of substantially identical semi-cylindrical light collectors 46 and 47, respectively, having a first surface 48 for receiving light from the lamps 18 and 20 and a support means 49 including a pair of elongate members 50 and 52, respectively, having a lower surface at which the other end of the fiber array terminates. These respective members are integrally bonded to each other as by means of an adhesive 53 so as to provide a unitary optical element within which the optical fiber array 44 is sealed, the fibers being positioned adjacent to and perpendicular to the length of the light collectors 46 and 47, and being further supported through the element by each half of the members 50 and 52.

The light collectors 46 and 47 are desirably formed of 8 mm diameter glass rods having an index or refraction between 1.56 and 1.62, selected to be as close as possible to the index of the fiber core to be used therewith. The rods are sectioned parallel to the axis thereof such that the cross-section of each of the collectors 46 and 47 consists of slightly greater than a semicircular portion. The top surface of each collector 46 and 47 is ground and polished to provide a 0.25 inch (6.3 mm) wide top surface which is coplanar with the top edge of the optical fiber array 44. Typically, both parts 46 and 47 of the light collection member 45 and the fiber array 44 are assembled with an excess length of the fibers protruding beyond the edge of the light collectors 46 and 47, after which the combined members are simultaneously ground and polished to provide the top planar surfaces thereof.

Preferably, the polished top surface is further provided with a tough, abrasion-resistant, and optically transparent overlayer 54 which is in intimate optical contact with the fibers and has an index of refraction substantially the same thereas. Such a layer reduces reflection from scratches and the like on the fiber ends, and also fills voids between adjacent fiber ends to reduce dirt pickup and light scattering therefrom. The use of such a layer also aids in the finishing of the fiber ends and collector surface as a final polishing step otherwise necessary to remove minor surface scratches, may now be eliminated. A particularly desirable top layer may be formed of an ambifunctional silane, such as epoxy-functional silanes and acryloxy or methacryloxy-functional silanes such as those disclosed in U.S. Pat. Nos. 3,955,035; 4,026,826; 4,049,861; and 4,073,967 and U.S. Ser. No. 764,817 filed 2 February 1977 in the name of Fox et al. In a preferred example, a coating of a solvent based epoxy terminated silane together with an acid catalyst, selected to have an index of refraction substantially the same as the glass fibers, was applied approximately 4 μm thick, after which it was oven cured at 50° C.

The halves 50 and 52, respectively, of the support member 49 are preferably formed of an extruded or molded plastic such as 20% glass filled polycarbonate or glass filled phenolic resin. The respective halves are then integrally joined together with the adhesive 53, selected to be compatible with both the optical fibers and the glass rods used in the light reflecting members 46 and 48. Preferably, for example, epoxy adhesives such as EPO-TEK Type 301, TRAY-BOND Type 2115, or HY-SOL Type 0151 are desirably utilized. Upon completion of the assembly of the element, the lower surface of the fiber array 44 and that of the support members 50 and 52 are desirably simultaneously ground and polished to provide a lower planar surface, after which the top layer 54 may be added if desired.

The optical element 12 is positioned between the housing members 14 and 16 such that light from the lamps 18 and 20 collected within the semicylindrical surfaces 48 of the light collectors 46 and 47 is directed into the fibers and thence outward through the top ends thereof, as well as through the top surface of the members 46 and 47, so as to illuminate a graphic original which may be traversed thereacross. The top surfaces of the members 46 and 47 are preferably mutually coplanar with the top surfaces of both housing members 14 and 16 to thus provide a support for the traversed original. Graphic matter thus illuminated is transmitted through the optical fiber array 44 to the lower surface of the base of the support member 49 to illuminate a receptor sheet which may be traversed along the substantially mutually coplanar surfaces of the base and housing members thereat.

Figure 3:
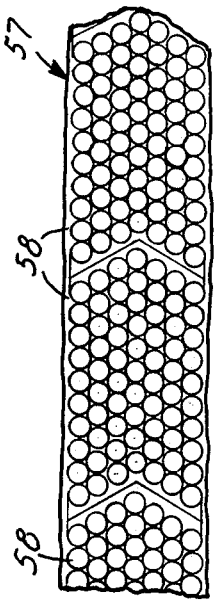
FIG. 3 is a top view of one embodiment of the optical element included in the assembly shown in FIGS. 1 and 2.
Figure 4:
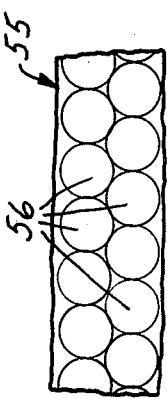
FIG. 4 is a top view of another embodiment of the optical element included in the assembly shown in FIGS. 1 and 2.

Examples of arrangements of optical fibers included in the array 44 are shown in FIGS. 3 and 4. In one embodiment shown in FIG. 3, the array 55 consists of a double staggered row of optical fibers 56 surrounded by a suitable bonding medium. Such fibers may have, for example, an average diameter of 0.0035 inches (0.089 mm) such that the staggered configuration, a substantially linear array approximately 0.006 inches (0.15 mm) wide is provided. Such fibers are typically a glass having a core characterized by an index of refraction of 1.62 and an outer cladding layer having an index of refraction of 1.48, such as manufactured by Welch Allyn Company of Skaneateles Falls, N. Y. Such fibers are characterized by a numerical aperture typically 0.66. A similar array may likewise be provided by utilizing fibers having diameters ranging between 0.0005 inch (0.013 mm) and 0.003 inch (0.08 mm), and having indexes of refraction commensurate with a numerical aperture of at least 0.35. In an alternative embodiment shown in FIG. 4, the array 57 includes a plurality of subassemblies 58, each of which includes a number of substantially smaller diameter fibers than those shown in FIG. 3, such as fibers 0.00086 inch (0.022 mm) in diameter. The subassemblies are positioned in an overlapping arrangement as there shown to provide an appropriately overlapped array capable of providing streak-free images. Such an array of subassemblies is typically available from Galileo Electro-Optics Corp., Sturbridge, Mass.

Figure 5:
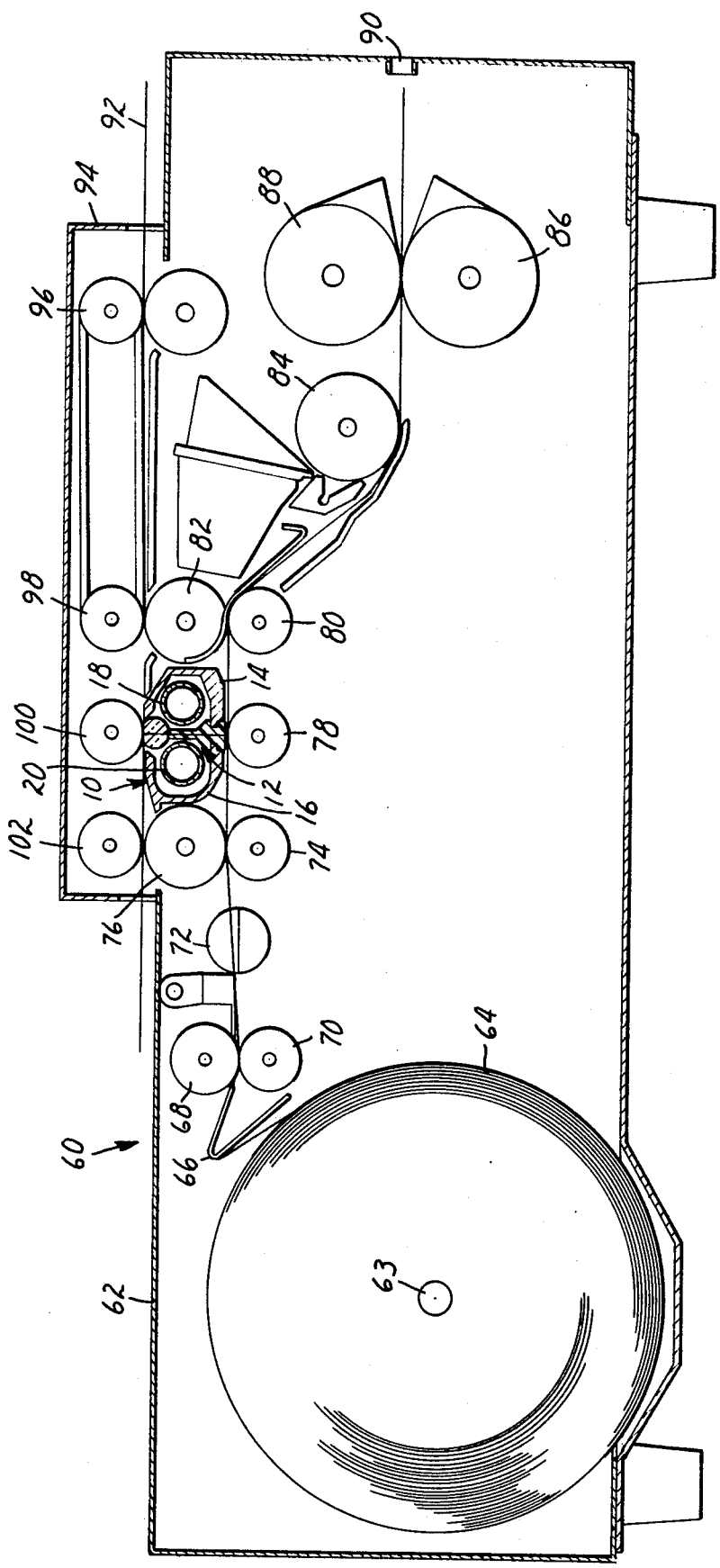
FIG. 5 is a cross-sectional view of a photocopier in which the assembly of FIGS. 1 and 2 is utilized.

A preferred manner in which the optical assembly shown in FIGS. 1 and 2 is utilized in an electrographic photocopy machine is shown in FIG. 5. In a typical embodiment, the copy machine 60 may be seen to include a housing 62 within which are positioned means 63 for supporting a supply roll 64 of copy or receptor sheets. Such a roll typically comprises a web of commercially available photosensitive paper such as available from Minnesota Mining and Manufacturing Company as Type 470 paper. In the embodiment shown, the leading edge of the supply roll 64 is directed across a guide member 66 and through a first pair of feed rollers 68 and 70 respectively. The sheets are then directed through a cutoff device 72 and thence through charging rollers 74 and 76. The sheets are next directed past an exposure station, including an exposure roller 78 which presses the sheets against the lower surface of the optical element 12 within the optical assembly 10 as shown in FIGS. 1 and 2. The thus exposed sheets are then directed through the second set of feed rollers 80 and 82, past a developer roll 84, at which point toner powder is directed onto the selectively charged areas, and past pressure fusing rollers 86 and 88 to provide a copy at a discharge station 90.

Simultaneously with the traversal of a copy sheet from the roll 64 across the lower surface of the optical element 12, a graphic original 92 is caused to be traversed across the upper surface of the optical element within an exposure station 94. Such a station typically includes simultaneously driven rollers 96, 98, 100, and 102, such that an original 92 fed into the first roller 96 is continuously driven across the optical element 12, thus exiting opposite the final roller 102. As may be seen in FIG. 5, the integrated optical assembly 10 is readily installed within the copier 60 such as by means of the support members 22 shown in FIG. 1. The integrated assembly requires no separate positioning or alignment of either the illuminating or image transmitting components and is ideally suited to being included in a wide variety of similar type photocopy devices.

In alternative embodiments, the drive rollers 96, 98, 100, and 102, may be driven at the same or different surface speeds than that of the rollers 68, 70, 74, 76, 78, 80, 82, 84, 86, and 88, to provide variable enlargement or reduction of the copy along the direction of traversal.

Having thus described the present invention, what is claimed is:

1. A unitary optical element adapted for use in a photocopy machine for directing light onto a graphic original and for conveying light reflected therefrom onto a light sensitive receptor surface, said element comprising
   (a) a substantially linear array of mutually parallel coherent optical fibers,
   (b) a transparent light collection member having a first surface extending the length thereof for collecting light directed thereat, said member being positioned transversely to said fibers and integrally bonded in an optically coupled relationship thereto such that a first end of the fibers terminates coplanar with a top surface of said member, wherein said collected light is transmitted therethrough and thence through said fiber array to illuminate a narrow band adjacent the first end of said fibers, and
   (c) elongate support means within which said fiber array is integrally bonded and to which said collection member is integrally bonded, including a base section having a lower surface at which the other end of said fiber array terminates, whereby light thus directed illuminates successive lines of said original when caused to be traversed thereby and an image of said successive lines is formed on said receptor surface by reflected light conveyed through said fiber array when it is caused to be traversed thereby.

2. An optical element according to claim 1, wherein said light collection member includes two elongate sections, each of which is integrally bonded in an optically coupled relationship to opposite sides of said fiber array and has a said first surface for collecting light such that light directed into either section is directed therethrough and into said array of illuminate said narrow band adjacent said first end of the fibers.

3. An optical element according to claim 2, wherein said support means comprises two elongate halves between which said array is integrally bonded, each of said halves being further integrally bonded to one of said sections of said collection member.

4. An optical element according to claim 1, further comprising an optically transparent layer overlying and in intimate optical contact with said first end of said fibers, having an index of refraction substantially the same as that of said fibers, whereby said layer reduces reflections from scratches and the like on said ends and fills voids and the like between adjacent fiber ends to reduce dirt pickup and light scattering therefrom.

5. An optical element according to claim 1 wherein said fiber array comprises at least two staggered rows of fibers of substantially circular cross sections.

6. An optical element according to claim 1, wherein said fiber array comprises a plurality of subassemblies of groups of fibers each subassembly including a plurality of staggered rows of fibers and having overlapping ends to enable said assemblies to be placed end to end to form said substantially linear array.

7. An optical element according to claim 1 wherein said first surface of said light collection member comprises a substantially semicylindrical surface.

8. An optical element according to claim 7 wherein said collection member comprises a pair of glass rods of substantially circular cross-section, each of which is sectioned along a chord forming mutual surfaces between which said fiber array is bonded.

9. An optical element according to claim 1, wherein said fiber array comprises two rows of staggered fibers, each having a diameter of approximately 0.003", thus forming an array not exceeding approximately 0.006" wide and having a numerical aperture of approximately 0.66.

10. An integrated optical assembly adapted for use in a photocopier for directing light onto a graphic original and for conveying light reflected therefrom onto a light sensitive receptor surface, said assembly comprising
   (a) a unitary optical element including
      (i) a substantially linear array of mutually parallel coherent optical fibers,
      (ii) a transparent light collection member having a first surface extending the length thereof for collecting light directed thereat, said member being positioned transversely to said fibers and integrally bonded in an optically coupled relationship thereto such that a first end of the fibers terminates coplanar with a top surface of said member, wherein said collected light is transmitted therethrough and thence through said fiber array to illuminate a narrow band adjacent said first end of said fibers, and (iii) elongate support means within which said fiber array is integrally bonded and to which said collection member is integrally bonded, including a base section having a lower surface at which the other end of said fiber array terminates;

(b) a tubular lamp extending at least the length of said array, positioned parallel to and adjacent said first surface of said light collection member such that light therefrom is uniformly directed onto and through said first surface and thence through said fiber array;

(c) an elongate housing member having a recess extending therealong having a substantially U-shaped cross section, adapted to partially enclose said lamp, means for mating with said support means of said optical element to position said element across the open portion of said housing member, thereby completing the enclosure around said lamp such that light therefrom is directed only onto said collection member and is shielded from impinging on other surfaces so as to prevent undesired exposure of said receptor surface, and upper and lower surfaces coextensive with the top surface of said collection member and said lower surface of support means respectively when said optical element is positioned, for providing platens across which said original and said receptor surface may be traversed, and (d) bracket means for supporting said housing member adjacent the respective ends thereof such that the optical element is firmly positioned between the open portion of said housing member, for supporting said lamp centered within said recess of said housing member and for mounting said assembly in said photocopier.

11. An optical assembly according to claim 10, wherein said light collection member includes two elongate sections, each of which is integrally bonded in an optically coupled relationship to opposite sides of said fiber array and has a said first surface for collecting light, a said tubular lamp being positioned parallel to and adjacent each of said first surfaces such that light directed into either section is directed therethrough and into said array to illuminate said narrow band adjacent said first end of the fibers.

12. An optical assembly according to claim 11 wherein said support means of the optical element comprises two elongate halves between which said array is integrally bonded, each of said halves being further integrally bonded to one of said sections of said collection member.

13. An optical assembly according to claim 10, wherein said optical element further comprises an optically transparent layer overlying and in intimate optical contact with said first end of said fibers, having an index of refraction substantially the same as that of said fibers, whereby said layer reduces reflections from scratches and the like on said ends and fills voids and the like between adjacent fiber ends to reduce dirt pickup and light scattering therefrom.

14. An optical assembly according to claim 10 wherein said lamp includes an elongate window extending at least the length of said fiber array, said lamp being positioned within said housing member such that said window is adjacent a said light collection member, thus optimizing the coupling of light from the lamp into the collection member.

15. An optical assembly according to claim 10, wherein said housing member includes openings adapted to pass a coolant therethrough to enable cooling of said lamp enclosed therein.

16. A photocopier including means for traversing a graphic original past an exposure station, means for illuminating a line across the traversed original and for conveying light reflected from the illuminated line capable of forming an image of said original, and means for traversing a photo receptor adjacent another portion of said illuminating and conveying means to sequentially expose said receptor to said reflected light, wherein said illuminating and conveying means comprises (a) a unitary optical element including
(i) a substantially linear array of mutually parallel coherent optical fibers,
(ii) a transparent light collection member having a first surface extending the length thereof for collecting light directed thereat, said member being positioned transversely to said fibers and integrally bonded in an optically coupled relationship thereto such that a first end of the fibers terminates coplanar with a top surface of said member, wherein said collected light is transmitted therethrough and thence through said fiber array to illuminate a narrow band adjacent said first end of said fibers, and
(iii) elongate support means within which said fiber array is integrally bonded and to which said collection member is integrally bonded, including a base section having a lower surface at which the other end of said fiber array terminates;

(b) a tubular lamp extending at least the length of said array, positioned parallel to and adjacent said first surface of said light collection member such that light therefrom is uniformly directed onto and through said first surface and thence through said fiber array;

(c) an elongate housing member having a recess extending therealong having a substantially U-shaped cross section, adapted to partially enclose said lamp, means for mating with said support means of said optical element to position said element across the open portion of said housing member, thereby completing the enclosure around said lamp such that light therefrom is directed only onto said collection member and is shielded from impinging on other surfaces so as to prevent undesired exposure of said receptor surface, and upper and lower surfaces coextensive with the top surface of said collection member and said lower surface of support means, respectively, when said optical element is positioned, for providing platens across which said original and said receptor surface may be traversed, and (d) means for supporting said housing member adjacent the respective ends thereof such that the optical element is firmly positioned between the open portion of said housing member, for supporting said lamp centered within said recess of said housing member and for mounting said assembly in said photocopier.

17. A photocopier according to claim 16, further comprising means for traversing said graphic original and photo receptor at variable speeds with respect to each other to allow 1:1 or variable reductions or enlargements of the image along the direction of traversal.

* * * * *